United States Patent [19]

Imae et al.

[11] Patent Number: 5,118,576
[45] Date of Patent: Jun. 2, 1992

[54] MATERIAL FOR EXPANDED GRAPHITE GASKET

[75] Inventors: Kenji Imae, Takatsuki; Katsuhiko Masaki, Sakai; Hideo Miyake, Kure; Masahiko Soda, Amagasaki; Tsuguyasu Yoshii, Kishiwada; Takashi Okuyama, Mito, all of Japan

[73] Assignee: Nisshin Steel Co., Ltd., Tokyo, Japan

[21] Appl. No.: 674,570

[22] Filed: Mar. 25, 1991

[51] Int. Cl.⁵ .................. B32B 9/04; B32B 15/04; B32B 15/18
[52] U.S. Cl. ..................................... 428/408; 428/457
[58] Field of Search ................ 428/457, 244, 408; 429/19, 17

[56] References Cited

U.S. PATENT DOCUMENTS 4,990,402  2/1991  Kneringer et al. .............. 428/408
5,061,562  10/1991 Yamanaka et al. .............. 428/408

*Primary Examiner*—Thomas J. Herbert, Jr.
*Attorney, Agent, or Firm*—Darby & Darby

[57] ABSTRACT

Material for expanded graphite gasket comprising an expanded graphite sheet and a stainless steel sheet provided on its surface with a coating layer of a predetermined metal, the expanded graphite sheet and the stainless steel sheet being adhered to each other by use of adhesive.

1 Claim, No Drawings

MATERIAL FOR EXPANDED GRAPHITE GASKET

BACKGROUND OF THE INVENTION

The invention relates to material for an expanded graphite gasket which gasket material is superior in sealing efficiency, handling properties and workability.

A sheet made of expanded graphite which sheet is formed by cold working of expanded graphite granules having memory effect against compaction is one of general gasket materials. The expanded graphite sheet has good sealing efficiency and is chemically stable, so that it well serves as gasket material made of non-asbestos compound. However, the expanded graphite sheet is not sufficient in tensile strength and toughness, so that the gasket material has the defect to be poor in handling property as readily cracked to fall at a portion of the sheet when subjected to pressure.

As a remedy for the defect, there has been used such gasket material formed by that a sheet metal, for example, of stainless steel having circular or rectangular protuberances is used as a core for reinforcing, and the expanded graphite sheets are fit over the core by rolling and fixed thereto by use of the protuberances.

Also, as another type of remedy, such gasket material has been used that the expanded graphite sheet and a sheet metal of stainless steel or the like as the core are overlapped and adhered to each other by use of resinous adhesive to thereby be reinforced.

In the former type of remedy, for fixing the expanded graphite sheet to the sheet metal core by use of the protuberances, the expanded graphite sheet is required to have a thickness for enclosing the protuberances and including the height thereof, inevitably to be thick more than 0.8 mm. This means that when applied to joints of high internal pressure, the gasket material has a defect to readily cause leakage of fluid.

Also, the core for reinforcing which has the protuberances needs to be inevitably more than 0.2 mm (200 μm) in thickness, so that the gasket material having the core is poor in general-purpose properties when it is to be punched or simply cut for use. Also, the gasket material which is provided with the metal protuberances as aforesaid needs more than 39.2 MPa of clamping pressure in use.

In the foregoing another type of remedy, the core would be poor in strength when using an aluminum sheet metal, and readily corrosible when using common steel sheet metal, so that the core generally employs the stainless steel sheet metal. The gasket material when the expanded graphite sheet is adhered to the stainless steel sheet metal by use of adhesive has sufficient strength and is superior in corrosiveness with a thinner stainless steel, but has such a problem in adhesion properties that when the gasket material is repeatedly heated and cooled in a high temperature range, the expanded graphite sheet is readily peeled from the stainless steel sheet metal to be poor in reliability.

In the above method using the adhesive for fixing the expanded graphite sheet to the core for provision of gasket material, sealing material using foil in place of the sheet metal has been adopted. This gasket material has good workability, needs clamping pressure about 23.5 MPa in use and exhibits an excellent sealing efficiency, but has a problem in selection of materials for foils as that aluminum foil cannot compensate for fragility of expanded graphite, iron foil is readily corrosible and stainless foil (which is practically used in general) is likely to be peeled in a high temperature region.

Gasket material using expanded graphite without the above defects has been expected in the field.

SUMMARY OF THE INVENTION

An object of the invention is to provide gasket material superior in a sealing efficiency, handling properties and workability. A further object of the invention is to provide gasket material which uses an expanded graphite sheet, can fully compensate for fragility of the expanded graphite and remarkably prevents the expanded graphite sheet from being peeled.

DETAILED DESCRIPTION OF THE PREFERRED EMBODIMENTS

Under the above circumstances, the inventors have positively studied and found that an oxide layer existing on the surface of stainless steel notably disturbs adhesive properties between the stainless steel and adhesive, and the present invention has been achieved from a further continuous study of the inventors. The present invention is characterized in that a metal of one of Al, Sn, Zn, and Fe or more than two thereof in combination is coated on the surface of stainless steel to improve quality of the surface in order to improve its adhesive properties with an adhesive layer.

The inventors have found that the gasket material of the present invention constructed above has a sufficient adhesive strength in a temperature range higher than a temperature limit that the adhesive usually exhibits heat resistance.

The "stainless steel" herein referred to may use ferritic, austenitic, martensitic, duplex, and precipitation hardened stainless steels, typically SUS304H or SUS301H steels. The thickness of the "sheet metal" are not limited but preferably 10 to 300 μm, particularly preferably 30 to 150 μm. There is a fear to cause no reinforcement effect with the thickness of sheet metal less than 10 μm and that punching is hard to be conducted and the expanded graphite sheet is damaged due to pressure applied upon molding of gasket when the thickness of sheet metal is more than 300 μm.

"Coating layer" is formed with one of the four kinds of metals Al, Sn, Zn and Fe or more than two thereof in combination and may generically include all of a single layer made of one kind of metal of the above metals, a multiple layer made of more than two thereof, a single layer made of alloy of any of the metals, and a multiple layer made of different kinds of the alloys, and the like. It is preferable that each layer contains aluminum having corrosion resistance and heat resistance. Also, the coating layer and the stainless steel are required to have therebetween an excellent adhesion property also in a high temperature region.

The above four kinds of metals have been selected since they have definite effects on the invention, readily form the coating layer through galvanizing or other techniques and are cheap for use.

Coating method is not limited in the present invention but those satisfying the conditions thereof are electroplating, hot dipping, vapor deposition, spray coating (metallicon and the like), and mechanical plating and the like. Alloy plating may be easily usable for forming a layer made of more than two kinds of metals.

The thickness of the coating layer is also not limited in the invention, but preferably 0.01 to 20 μm in consideration that the sheet metal surface is uniformly coated and the thickness of the core member is not to be increased. The coating layer to be provided onto the stainless steel sheet may be applied thereto either at one side or both sides thereof.

"Expanded graphite" may be obtained by the following process. Natural graphite, pyrolytic graphite, Kish graphite or the like are treated by sulfuric acid, sodium nitrate, potassium permanganate, or bromine or halide to obtain an interlaminar compound which is a crystalline compound formed by that another reactive substance enters layers of layer structure of graphite to bond with carbon plane, keeping the layer structure of carbon atoms. The crystalline compound is processed at high temperature to cause the interlaminar compound to yield gas, thereby expanding intervals of the graphite layers usually 100 to 200 times in the direction perpendicular to the carbon plane to thereby provide expanded graphite.

The expanded graphite may be mixed with synthetic resin such as cellulose acetate, phenol resin or the like as binder, or may contain oxidized graphite. That is, the expanded graphite of the present invention is enough to contain the foregoing expanded graphite as chief material and may be freely mixed with others.

"Adhesive" is enough to serve for the purpose of the present invention as having heat resistance and the like, so that it is not specifically limited to particular kinds of adhesives, but may preferably use phenol resin, epoxy resin, imido resin and the like as thermosetting adhesive in view of general-purpose properties and reliability.

EXAMPLES

Next, the present invention will be detailed with referring to specific examples.

EXAMPLE 1

A stainless steel sheet (SUS304H, 50 μm in thickness) which had bee plated at both sides with aluminum (0.01/0.01 μm in thickness) by vacuum deposition was used as the core and adhered at its both sides by use of phenol resin with expanded graphite sheet (made by Sumitomo Metal Industries, Ltd., SG sheet, 0.2 mm in thickness, 1.0 g/cm$^3$ in density) to form expanded graphite gasket material.

EXAMPLE 2

A stainless steel sheet (SUS301H, 50 μm in thickness) which had bee plated at both sides with aluminum (0.01/0.01 μm in thickness) by vacuum deposition was used as the core and adhered at its both sides by use of the same phenol resin with the same expanded graphite sheet as used in Example 1 to form expanded graphite gasket material.

EXAMPLE 3

A stainless steel sheet (SUS304H, 50 μm in thickness) which has bee plated at both sides with aluminum (1.0/1.0 μm in thickness) by electroplating was used as the core and adhered at its both sides by use of the same phenol resin with the same expanded graphite sheet as used in Example 1 to form expanded graphite gasket material.

EXAMPLE 4

A stainless steel sheet (SUS304H, 50 μm in thickness) which had bee plated at both sides with iron (0.01/0.01 μm in thickness) by electroplating was used as the core and adhered at its both sides by use of the same phenol resin with the same expanded graphite sheet as used in Example 1 to form expanded graphite gasket material.

EXAMPLE 5

A stainless steel sheet (SUS304H, 50 μm in thickness) which had bee plated at both sides with zinc (0.01/0.01 μm in thickness) by electroplating was used as the core and adhered at its both sides by use of the same phenol resin with the same expanded graphite sheet as used in Example 1 to form expanded graphite gasket material.

EXAMPLE 6

A stainless steel sheet (SUS301H, 50 μm in thickness) which had bee plated at both sides with tin (0.01/0.01 μm in thickness) by electroplating was used as the core and adhered at its both sides by use of the same phenol resin with the same expanded graphite sheet as used in Example 1 to form expanded graphite gasket material.

EXAMPLE 7

A stainless steel sheet (SUS301H, 50 μm in thickness) which had bee plated at both sides with alloy of aluminium and zinc (0.01/0.01 μm in thickness) by vacuum deposition was used as the core and adhered at its both sides by use of the same phenol resin with the same expanded graphite sheet as used in Example 1 to form expanded graphite gasket material.

EXAMPLE 8

Two stainless steel sheets plated with aluminium and as used in Example 1 and three expanded graphite sheets as used in Example 1 were used and disposed alternately to be adhered together by use of the same phenol resin as used in Example 1 to form a multi-layered gasket material made of expanded graphite in which gasket material each expanded graphite layer and each core member are disposed alternately and continuously.

COMPARISON 1

A stainless steel sheet (SUS304H, 50 μm in thickness) was used as the core and adhered at its both sides by use of the same phenol resin with the same expanded graphite sheets as used in Example 1 to provide expanded graphite gasket material.

COMPARISON 2

A stainless steel sheet (SUS304H, 50 μm in thickness) which had been coated at its both sides with primer was used as the core and adhered at its both sides by use of the same phenol resin with the same expanded graphite sheets as used in Example 1 to provide expanded graphite gasket material.

Results of Tests

The following tests were conducted on the expanded graphite gaskets fabricated in Examples 1 to 4 and Comparisons 1 and 2.

(1) Mandrel Winding Property

Specimen of 15×15 mm was wound onto mandrel of 14 mmφ to visibly check the state of peel of the expanded graphite sheet from the core at curved portions of the wound specimen.

(2) Repeated Heating Property

Specimen of 50×50 mm were tested in five cycles of the test in each which cycle the specimen is heated to 350° C. in atmosphere and kept as it is for 10 hours and then cooled to normal temperature and kept as it is for 14 hours. Then, the state of peel of the expanded graphite sheet from the core was visibly checked.

Results of the test (1) and (2) are shown in Table 1. In view of Table 1, it will be appreciated that the gasket materials obtained in Examples 1 to 7 using the stainless steel sheets improved on the surface through metal plating are largely improved in the outstanding adhesive properties between the cores and the expanded graphite sheets in comparison with those of Comparisons 1 and 2 using stainless steel sheets which are given no treating or coated with non-metal such as primer.

TABLE 1

|  | Mandrel Winding Property | Repeated Heating Property |
| --- | --- | --- |
| Example 1 | Peel of graphite None | Peel of graphite None |
| Example 2 | Peel of graphite None | Peel of graphite None |
| Example 3 | Peel of graphite None | Peel of graphite None |
| Example 4 | Peel of graphite None | Peel of graphite None |
| Example 5 | Peel of graphite None | Peel of graphite None |
| Example 6 | Peel of graphite None | Peel of graphite None |
| Example 7 | Peel of graphite None | Peel of graphite None |
| Example 8 | Peel of graphite None | Peel of graphite None |
| Composition 1 | Peel of graphite Large | Peel of graphite Completely |
| Composition 2 | Peel of graphite Small | Peel of graphite Completely |

EFFECTS OF THE INVENTION

As minutely referred to above, the expanded graphite gasket material of the present invention is characterized in that the expanded graphite sheet is adhered by use of adhesive to a coating layer side of stainless steel sheet having the coating layer made of one kind of Al, Sn, Zn and Fe or more than two kinds thereof in combination, so that the invention has the following various advantages to be in high level.

(1) The expanded graphite gasket material of the present invention exhibits an excellent adhesive property in the mandrel winding and repeated heating tests, so that it is not readily deteriorated.

(2) The expanded graphite gasket material is superior in handling properties.

(3) The expanded graphite gasket material which can be formed with a thinner core member does neither cause leakage of fluid nor damage an excellent inherent sealing efficiency of the expanded graphite sheet when the gasket material is applied to joints of high internal pressure.

What we claimed is:

1. Material for expanded graphite gasket characterized in that an expanded graphite sheet and a stainless steel sheet having a coating layer made of one kind of Al, Sn, Zn and Fe or more than two kinds thereof in combination are adhered to each other by use of adhesive.

* * * * *